United States Patent
Ansari et al.

(10) Patent No.: US 12,020,021 B2
(45) Date of Patent: Jun. 25, 2024

(54) IMPACTLESS FIRMWARE UPDATE

(71) Applicant: XILINX, INC., San Jose, CA (US)

(72) Inventors: Ahmad R. Ansari, San Jose, CA (US); Felix Burton, Foster City, CA (US)

(73) Assignee: XILINX, INC., San Jose, CA (US)

( * ) Notice: Subject to any disclaimer, the term of this patent is extended or adjusted under 35 U.S.C. 154(b) by 19 days.

(21) Appl. No.: 17/839,265

(22) Filed: Jun. 13, 2022

(65) Prior Publication Data
US 2023/0401054 A1    Dec. 14, 2023

(51) Int. Cl.
*G06F 8/656* (2018.01)
*G06F 9/4401* (2018.01)
*G06F 9/445* (2018.01)
*G06F 21/57* (2013.01)

(52) U.S. Cl.
CPC ............ *G06F 8/656* (2018.02); *G06F 9/4401* (2013.01); *G06F 9/445* (2013.01); *G06F 21/572* (2013.01); *G06F 2221/033* (2013.01)

(58) Field of Classification Search
CPC .... G06F 8/60–66; G06F 9/445; G06F 21/572; G06F 2221/033
USPC .................................................. 717/168–178
See application file for complete search history.

(56) References Cited

U.S. PATENT DOCUMENTS

| | | | | |
|---|---|---|---|---|
| 6,931,637 B2* | 8/2005 | Lee | ........................... | G06F 8/65 717/169 |
| 2004/0083476 A1* | 4/2004 | Zhou | ....................... | G06F 8/656 718/102 |
| 2012/0072734 A1* | 3/2012 | Wishman | ................. | G06F 21/60 713/189 |
| 2015/0271297 A1* | 9/2015 | Zimmer | ................ | H04L 1/0041 709/203 |
| 2016/0266894 A1* | 9/2016 | Panicker | ................. | G06F 8/656 |
| 2017/0090899 A1* | 3/2017 | Hathorn | ................ | G06F 9/4411 |
| 2021/0011706 A1* | 1/2021 | Nachimuthu | .......... | G06F 3/0602 |

FOREIGN PATENT DOCUMENTS

JP     2008047112 A  *  2/2008  .......... G06F 11/0706

OTHER PUBLICATIONS

Dynamic software updating, Wikipedia, 2021, 9 pages, [retrieved on Feb. 27, 2024], Retrieved from the Internet: <URL:https://web.archive.org/web/20211203055948/https://en.wikipedia.org/wiki/Dynamic_software_updating>.*

* cited by examiner

*Primary Examiner* — Geoffrey R St Leger
(74) *Attorney, Agent, or Firm* — Patterson + Sheridan, LLP (57) ABSTRACT

Techniques to update firmware without a system reset include preserving state information associated with one or more firmware services, suspending processing of firmware service requests, loading an updated firmware image, and resuming processing of firmware service requests based on the preserved state information and the updated firmware image. Unpreserved states of one or more other firmware services may be recreated upon resumption of processing of the firmware service requests.

20 Claims, 5 Drawing Sheets

IMPACTLESS FIRMWARE UPDATE

TECHNICAL FIELD

Examples of the present disclosure generally relate to firmware updates.

BACKGROUND

Firmware may include instructions to initialize or configure hardware resources of a platform, initiate a boot sequence, and/or preform platform management services while the platform is in an operational state.

Firmware may be encoded or stored in erasable/reprogrammable non-volatile memory, such as flash memory. This may be useful to permit updates, such as to fix bugs or add features.

Conventionally, a platform is reset following a firmware update to force the platform to load, authenticate, and execute the updated firmware. The resulting downtime may be detrimental in terms of cost, productivity, and/or safety.

SUMMARY

Techniques for impactless firmware updates are described.

An example described herein is a bootable platform that includes first and second subsystems, where the first subsystem performs firmware services based on an initial firmware image loaded in memory and firmware service requests from the second subsystem, and performs a firmware update while the second subsystem system remains operational by preserving state information associated with one or more of the firmware services, suspending processing of the firmware service requests from the second subsystem, loading an updated firmware image in the memory, and resuming the processing of the firmware service requests from the second subsystem based on the updated firmware image loaded in the memory and the preserved state information.

Another example is a method that includes, on a first subsystem of a bootable platform, performing firmware services based on an initial firmware image loaded in memory and firmware service requests from a second subsystem of the bootable platform, and performing a firmware update while the second subsystem system remains operational by preserving state information associated with one or more of the firmware services, suspending processing of the firmware service requests from the second subsystem, loading an updated firmware image in memory, and resuming the processing of the firmware service requests from the second subsystem based on the updated firmware image loaded in the memory and the preserved state information.

Another example is an integrated circuit that includes first and second subsystems, where the first subsystem performs firmware services based on an initial firmware image loaded in memory and firmware service requests from a second subsystem of the bootable platform, and performs a firmware update while the second subsystem system remains operational by preserving state information associated with one or more of the firmware services, suspending processing of the firmware service requests from the second subsystem, loading an updated firmware image in the memory, and resuming the processing of the firmware service requests from the second subsystem based on the updated firmware image loaded in the memory and the preserved state information.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques to update firmware of a platform without resetting the platform and without adversely affecting other operations or subsystems of the platform. This may be useful to avoid downtime.

As an example, data centers utilize firmware updates to provide patches and fixes for security and services. Existing firmware executing within the data center has already been authenticated and is responsible for continued platform configuration and maintenance. A firmware update may involve updates to many (e.g., thousands) of computing systems (e.g., boards) within the data center. A system reset produces a ripple effect on software executing on various processors of the data center, which negatively impacts efficiency of the data center. An impactless firmware update, as disclosed herein alleviates these issues.

Figure 1:
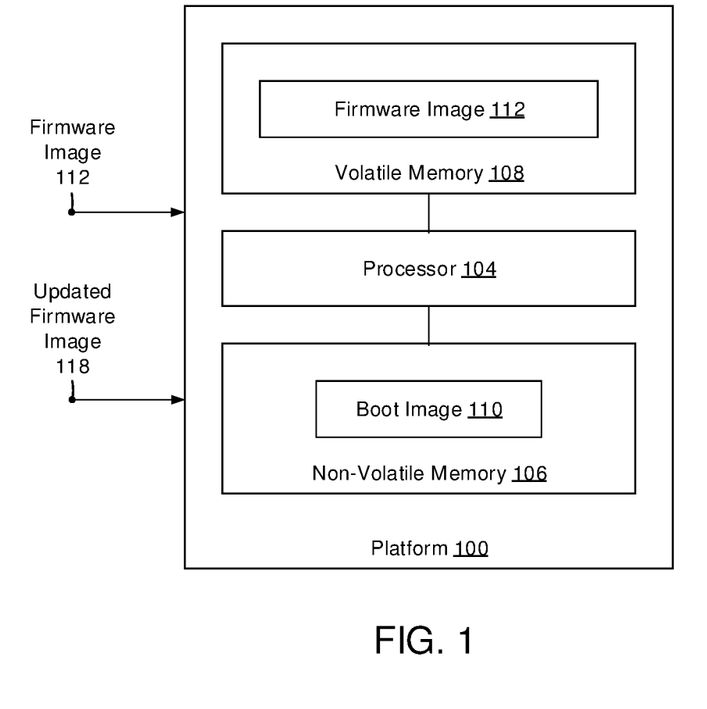
FIG. 1 is a block diagram of a platform, according to an embodiment.

FIG. 1 is a block diagram of a platform 100, according to an embodiment. Platform 100 may represent an integrated circuit device (e.g., a die, a chip, a chipset, a system-on-a-chip (SoC', and/or a field programmable gate array (FPGA)), a computer, a server, a bank of computers and/or servers, a board and/or combinations thereof. Platform 100 is not, however, limited to these examples. Platform 100 may be referred to herein as a bootable platform, a computing platform, or a bootable computing platform.

Platform 100 includes one or more processors or processor cores, illustrated here as a processor 104 that executes instructions encoded within a computer-readable medium. Instructions encoded within a computer-readable medium may be referred to herein as software.

In FIG. 1, the instructions include a firmware image 112 loaded in volatile memory 108. Firmware image 112 includes firmware instructions and may also include data for use by processor 104 when executing the firmware instructions.

Volatile memory 108 may include random-access memory (RAM), dynamic random-access memory (DRAM), and/or other type(s) of volatile memory.

In FIG. 1, instructions further include a boot image 110. Boot image 110 includes instructions that are automatically executed by processor 104 following a reset. In an embodiment, processor 104 executes boot image 110 in non-volatile memory 106. Alternatively, processor 104 may load a portion of boot image 110 to volatile memory 108 and execute the portion in volatile memory 108.

Boot image 110 may include instructions to cause processor 104 to access or retrieve firmware image 112 from an external device, such as a flash memory device, and to load firmware image 112 to volatile memory 108.

Boot image 110 may include instructions to cause processor 104 to authenticate firmware image 112. Authentication may be based on a hash value of firmware image 112. Processor 104 may authenticate firmware image 112 in a dedicated or access protected region of volatile memory 108. An elliptic curve digital signature algorithm (ECDSA) may be used.

Boot image 110 may further include instructions to cause processor 104 to decrypt firmware image 112.

Firmware image 112 includes instructions to cause processor 104 to perform firmware services. The firmware services may include initialization services, such as hardware configuration. The firmware services may further include platform management services such as, without limitation, power management, reconfiguration or partial reconfiguration, error management, subsystem shutdown/restart, health monitoring, and/or soft error mitigation. Platform management services may include and/or may be referred to herein as run-time services.

Processor 104 may perform platform management services based on service requests from upper-level software executing on processor 104 or on a different processor in the platform 100.

The upper-level software may include an operating system, or an application program hosted by an operating system. Processor 104 may initiate a boot sequence to load the operating system based on boot image 110 and/or firmware image 112.

As described herein, platform 100 performs firmware updates without resetting platform 100, and without adversely impacting other operations or subsystems of platform 100, such as upper-level software. This is referred to herein as an impactless firmware update. An impactless firmware update may help to avoid or reduce downtime.

For illustrative purposes, impactless firmware updates are described below with respect to firmware image 112 and an updated firmware image 118, which is received by the platform 100, Firmware image 112 may be referred to herein as an initial or original firmware image 112.

Updated firmware image 118 may be programmed in a flash device, such as by a board management controller (BMC) or by upper-level software running on a real-time processing unit (RPU) or an application processing unit (APU), independently.

When a firmware update is initiated, processor 104 preserves states or state information associated with one or more of the firmware services, suspends firmware services (e.g., suspends or idles processing of service requests), loads updated firmware image 118 into volatile memory 108, and resumes firmware services based on the preserved states and the updated firmware image 118 loaded in volatile memory 108.

Processor 104 may recreate states associated with one or more other firmware services and may resume the firmware services based further on the recreated states.

Processor 104 may authenticate updated firmware image 118, such as described above with respect to authentication of firmware image 112. Processor 104 may authenticate updated firmware image 118 as if loaded from a flash device.

Processor 104 may authenticate updated firmware image 118 prior to initiation of a firmware update. This may be useful to conserve resources and/or time during the firmware update. Results of such a pre-authentication may be compared to authentication information when the firmware update is initiated. If they match, the firmware update may proceed.

Processor 104 may decrypt updated firmware image 118, such as described above with respect to decryption of firmware image 112.

Depending on the size of volatile memory 108, there may not be enough space to maintain the entirety of firmware image 112 in volatile memory 108 during the firmware update. In an embodiment, a relatively small portion of firmware image 112 is retained in volatile memory 108 to manage the firmware update and to pass execution to updated firmware image 118 after updated firmware image 118 is loaded and authenticated. In this example, some services normally performed by firmware may be delayed during the firmware update until updated firmware image 118 is loaded and ready.

Processor 104, non-volatile memory 106, and volatile memory 108, may represent one of multiple subsystems of platform 100, such as described below with reference to FIG. 2.

Figure 2:
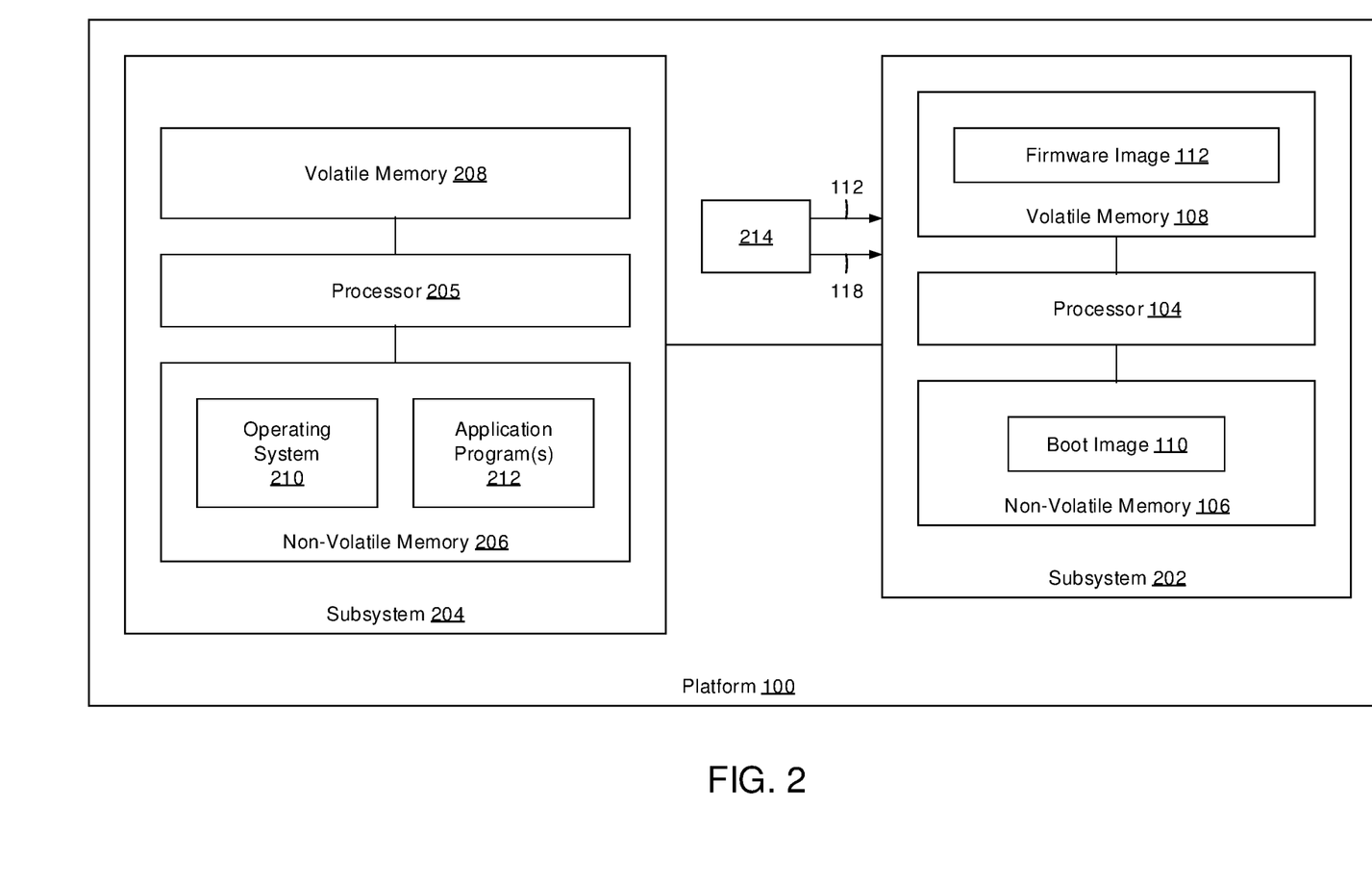
FIG. 2 is a block diagram of an embodiment of the platform of FIG. 1.

FIG. 2 is a block diagram of platform 100, according to an embodiment. In FIG. 2, platform 100 includes subsystems 202 and 204.

Subsystem 202 includes processor 104, non-volatile memory 106, boot image 110, volatile memory 108, and firmware image 112. In this example, subsystem 202 performs firmware services as described above with reference to FIG. 1, and processor 104 may be referred to as a firmware processor.

Subsystem 202 may represent a platform management system, such as a platform management controller (PMC), a platform security processor (PSP), and/or a management engine (ME). Subsystem 202 is not, however, limited to these examples.

Subsystem 204 includes a processor 205 that executes an operating system 210 to host an application program(s) 212. Subsystem 204 may include non-volatile memory 206 to store operating system 210 and application program(s) 212. Operating system 210 may be part of a programming image stored in non-volatile memory 206. Subsystem 204 may further include volatile memory 208. Processor 205 may be configured to execute operating system 210 and application program(s) 212 in volatile memory 208. Subsystem 204 may represent, without limitation, an application processing unit (APU) or a real-time processing unit (RPU).

In FIG. 2, when power is applied to platform 100 and a reset is released, processor 104 executes boot image 110. Based on boot image 110, processor 104 loads and authenticates firmware image 112 in volatile memory 108, such as described above with reference to FIG. 1. Processor 104 may retrieve firmware image 112 from a device 214, which may include, without limitation, dynamic random access memory (DRAM). Processor 104 then executes instructions of firmware image 112 to initialize hardware of subsystem 202, initiate a boot sequence of subsystem 204 to load operating system 210, and perform platform management services.

In an embodiment, subsystem 202 performs platform management services in response to inter-processor interrupts (IPIs) from subsystem 204. Further, subsystem 202 may perform firmware updates while subsystem 204 remains operational.

Subsystem 202 may perform a firmware update while subsystem 202 remains operational, except for processing firmware service requests and correctable errors that would normally be handled with firmware image 112. Alternatively, processor 104 may initiate a limited reset of subsystem 202 to load and authenticate updated firmware image 118. Subsystem 204 may copy or transfer updated firmware image 118 to device 214 prior to initiating a firmware update.

Subsystem 202 may include multiple processors, such as described below with reference to FIG. 3.

Figure 3:
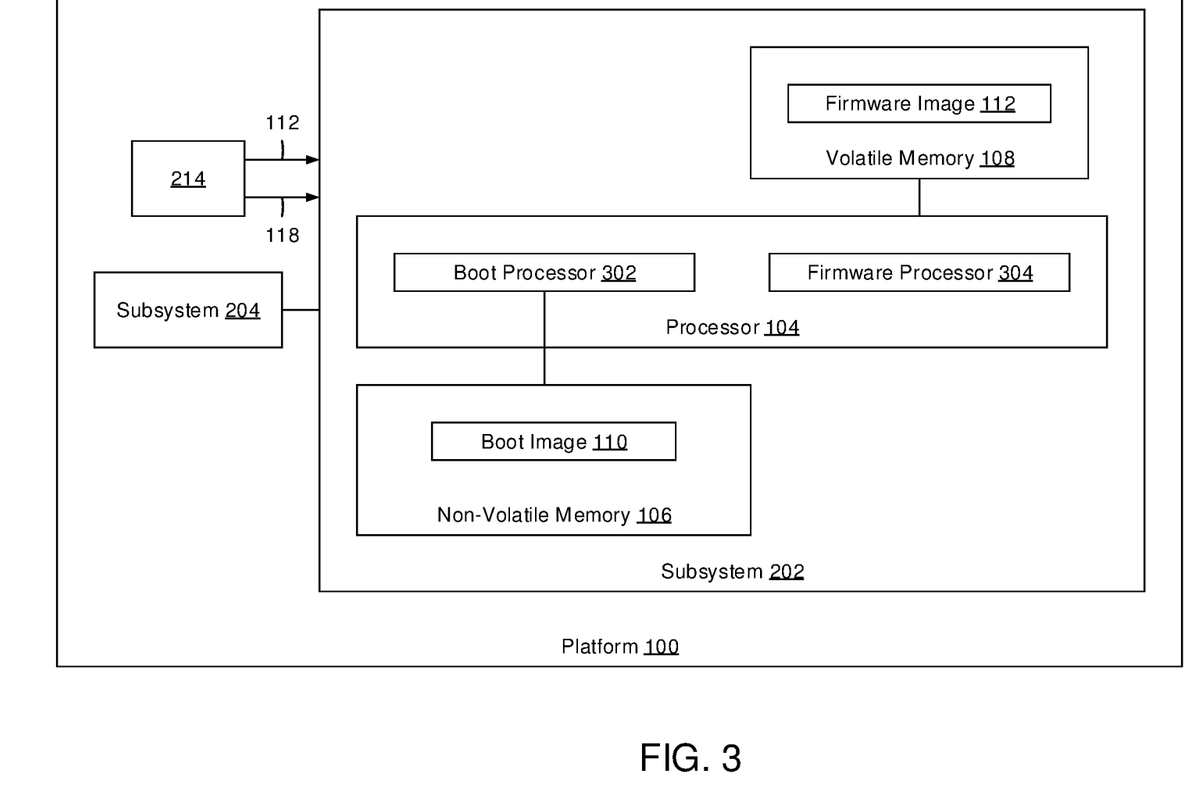
FIG. 3 is a block diagram of another embodiment of the platform of FIG. 1.

FIG. 3 is a block diagram of platform 100, according to an embodiment.

In the example of FIG. 3, processor 104 includes a boot processor 302 that executes instructions of boot image 110, and a firmware processor 304 that executes instructions of firmware image 112.

When platform 100 is reset, boot processor 302 executes instructions of boot image 110. Based on boot image 110, boot processor 302 may load, decrypt, and authenticate firmware image 112. Thereafter, firmware processor 304 executes instructions of firmware image 112 in volatile memory 108.

Non-volatile memory 106, or a portion thereof may be dedicated to (i.e., accessible only to) boot processor 302.

A portion of volatile memory 108 may be dedicated to firmware processor 304.

Platform 100, as described in one or more examples above, may perform Impactless firmware updates as described with reference to FIGS. 4 and 5.

Figure 4:
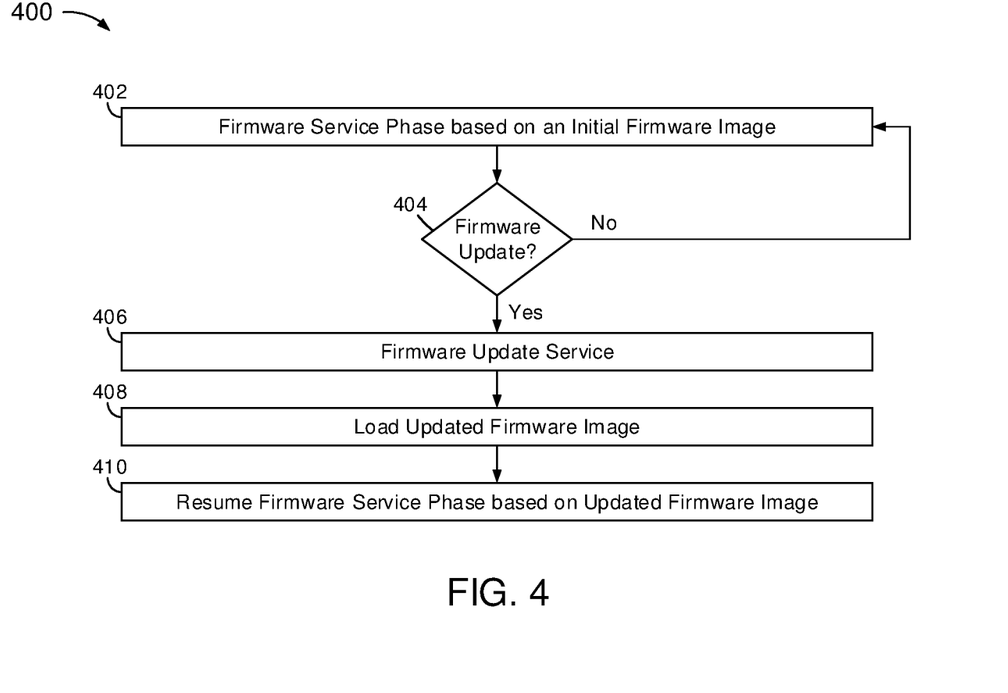
FIG. 4 is a flowchart of a method of performing an impactless firmware update, according to an embodiment.

FIG. 4 is a flowchart of a method 400 of performing an impactless firmware update, according to an embodiment.

At 402, processor 104 in FIG. 1 or FIG. 2, or firmware processor 304 in FIG. 3 performs firmware services in a firmware service phase based on firmware image 112 loaded in volatile memory 108. The firmware services include platform management services, such as power management, reconfiguration or partial reconfiguration, error management, subsystem shutdown/restart, health monitoring, and/or soft error mitigation. The firmware services may also include initialization services, such as hardware configuration services.

Processor 104 or firmware processor 304 may perform the platform management services in response to firmware service requests or interrupts. The interrupts may include inter-processor interrupts from upper-level software, such as from an operating system executing on processor 104 in FIG. 1 or operating system 210 of subsystem 204 in FIG. 2 or FIG. 3.

At 404, upper-level software (e.g., an operating system) executing on processor 205 or some other processor of platform 100 may determine to invoke a firmware update, such as with an IPI. In FIG. 2, operating system 210 of subsystem 204 may generate the IPI.

The upper-level software may assist with the firmware update. The upper-level software may, for example, transfer updated firmware image 118 to device 214 in FIG. 2 or FIG. 3 (e.g., DRAM) or to DRAM of subsystem 202 or DRAM of subsystem 204.

The upper-level software may provide a location address of the updated firmware image 118 with the IPI and/or may write the location address in registers, such as general-usage registers.

Updated firmware image 118 may be in a portable database image (PDI) format, and may include a header, updated firmware instructions, and configuration data, such as configuration data object (CDO) partitions. CDO partitions may include commands that are re-executed by processor 104 or firmware processor 304 during the firmware update and commands that are skipped during the firmware update.

At 406, processor 104 in FIG. 1 or FIG. 2, or firmware processor 304 in FIG. 3 initiates a firmware update service of firmware image 112 in response to the firmware update service request.

Platform 100 may be in an operational state when the firmware update service is invoked. Throughout the firmware update, platform 100 may continue functioning, except for firmware services.

As part of the firmware update service at 406, processor 104 in FIG. 1 or FIG. 2, or firmware processor 304 in FIG. 3 preserves a state or state information associated with one or more of the firmware services. States of one or more other firmware services may be overwritten or otherwise discarded. One or more of such unpreserved states may be recreated later based on updated firmware image 118.

States to be preserved may include, without limitation:
software error actions;
event notifications;
firmware task scheduling;
platform management state; and/or
hardware configurations that may impact other subsystems (e.g., phase locked loops, clock settings, and/or isolation).

Processor 104 or firmware processor 304 may save the states in volatile memory 108.

Processor 104 or firmware processor 304 may save the states in a format that permits quick or easy identification of a specific state.

As part of the firmware update service at 406, processor 104 in FIG. 1 or FIG. 2, or firmware processor 304 in FIG. 3 suspends or disables processing of firmware service requests.

In FIG. 3, disabling of firmware service requests avoids interrupting firmware processor 304 with events or service requests that may otherwise alter state of firmware processor 304 and delay the firmware update.

In an embodiment, processor 104 in FIGS. 1 and 2, or firmware processor 304 in FIG. 3 delays or queues firmware service requests for later processing. For some firmware services, such as time-critical firmware services, upper-level software may include provisions for timeout, cancellation, or retry.

In an embodiment, firmware services at 402 include error handling services. In this example, during the firmware update, processor 104 in FIG. 1 or FIG. 2, or firmware processor 304 in FIG. 3 may delay processing of correctable errors until completion of the firmware update. Correctable errors may include errors that normally generate an interrupt to processor 104 in FIG. 1 or FIG. 2, or firmware processor 304 in FIG. 3.

In an embodiment, upper-level software is configured to refrain from generating time-sensitive correctable errors during a firmware update.

For uncorrectable errors that occur during a firmware update, platform 100 may include hardware that initiates a platform reset or a power on reset. Uncorrectable errors may include, without limitation, an error related to authentication of updated firmware image 118. Authentication of updated firmware image 118 is discussed below with reference to 408 of method 400.

In an embodiment, an error processing unit of platform 100 is dynamically reconfigured for a duration of the firmware update to force a platform reset if certain errors occur during the firmware update. Prior settings of the error processing unit may be preserved and restored after the firmware update.

In an embodiment, processor 104 in FIG. 1 or FIG. 2, firmware processor 304 in FIG. 3, or a separate privileged service manager of platform 100 handles critical or fatal errors in a privileged state and/or with a privileged service during the firmware update.

In an embodiment, firmware services at 402 include anti-tamper services. Disabling of service requests or interrupts at 406 may impact anti-tamper responsibilities of firmware processor 384. Anti-tamper features of boot processor 382 may be unaffected.

As part of the firmware update service at 406, processor 104 in FIG. 1 or FIG. 2, or firmware processor 304 in FIG. 3 may determine whether updated firmware image 118 is compatible with firmware image 112. In an embodiment, processor 104 or firmware processor 304 determines compatibility based on image header information. If updated firmware image 118 is incompatible with firmware image 112, processor 104 or firmware processor 304 may log an update error, cancel the firmware update, and resume firmware services at 402 with firmware image 112.

Further regarding compatibility, in an embodiment, a firmware data structure that is retained over a firmware update includes an identifier, a version, and a size. The size may change as new data is added. The version may remain unchanged unless a meaning of a defined field differs between firmware image 112 and updated firmware image 118. Updated firmware image 118 may contain information regarding supported data structure versions to permit compatibility checking.

At 408, processor 104 in FIG. 1 or FIG. 2, or boot processor 302 in FIG. 3 loads updated firmware image 118 to volatile memory 108.

Processor 104 or firmware processor 304 may receive the location address of updated firmware image 118 with the firmware update service request (e.g., IR) or may retrieve the location address from registers. Firmware processor 304 may provide the location address to boot processor 302 to permit boot processor 302 to retrieve updated firmware image 118 from device 214 based on the location address.

In FIG. 3, the IPI generated by upper-level software at 404 may be passed to boot processor 302 through firmware processor 304. In an embodiment, only firmware processor 304 is configured to pass the request to boot processor 302, such as with a dedicated boot service request.

Processor 104 or firmware processor 304 may halt execution of firmware image 112 during the loading of updated firmware image 118.

Processor 104 in FIG. 1 or FIG. 2, or boot processor 302 in FIG. 3 may authenticate and/or decrypt updated firmware image 118 in the same or similar manner in which firmware image 112 is authenticated and/or decrypted.

Processor 104 or boot processor 302 may load an image header of updated firmware image 118 from a specified DRAM address. The image itself may then be loaded, authenticated, and decrypted (e.g., block by block), and loaded into volatile memory 108. At this stage, firmware image 112 or a portion thereof may be overwritten in volatile memory 108 (e.g., depending upon a capacity of volatile memory 108).

Processor 104 in FIG. 1 or FIG. 2, or boot processor 302 in FIG. 3 may determine a measurement for updated firmware image 118 (e.g., a hash), and may extend the measurement in a register (e.g., a platform control register). The measurement in the register may be used as a parameter for authentication of updated firmware image 118. A measurement log of updated firmware image 118 may be saved, such as in an extension log storage in the DRAM.

If any issues arise during loading of updated firmware image 118, processor 104 or boot processor 302 may log an error, and may process the error based on firmware image 112. In FIG. 3, firmware processor 304 may be woken to process the error.

In an embodiment, authentication errors or other errors during loading of updated firmware image 118 may be considered fatal and may force a full system restart through system reset.

In an embodiment, upper-level software makes hardware resources available to boot processor 302 in FIG. 3 during the loading of updated firmware image 118.

In an embodiment, subsystem 202 in FIG. 2 or FIG. 3 includes an access protection block to provide boot processor 302 with sole access to certain (e.g., critical) components during the firmware update, such as to permit boot processor 302 to authenticate updated firmware image 118. The access protection block may be reconfigured after updated firmware image 118 is loaded to release the components from boot processor 302 (e.g., to return the components to firmware processor 304).

Prior to loading updated firmware image 118, processor 104 or boot processor 302 may set a boot device, check a firmware update flag, and verify that processor 104 or boot processor 302 has access to components needed to authenticate and load updated firmware image 118.

During a firmware update, a watchdog timer of subsystem 282 may be managed by boot processor 302 based on a service of boot image 110.

If a non-fatal error occurs during the loading of updated firmware image 118 at 408, processor 104 or firmware processor 304 may resume the firmware service phase at 402 based on firmware image 112. A corresponding update error may already have been logged.

If a fatal error occurs during the loading of updated firmware image 118 at 408, processor 104 or boot processor 302 may assert a system reset based on boot image 110. Processor 104 or boot processor 302 may, for example, initiate a fatal software error to force a system reset.

If updated firmware image 118 is successfully loaded at 408, processing proceeds to 410. In FIG. 3, boot processor 302 may issue a software interrupt to wake firmware processor 304 after loading updated firmware image 118. The software interrupt may be referred to herein as a firmware update completion software interrupt. Boot processor 302 may then be idled or placed in a sleep state.

At 410, processor 104 in FIG. 1 or FIG. 2, or firmware processor 304 in FIG. 3 resumes the firmware service phase based on updated firmware image 118 loaded at 408 and states preserved at 408. Processor 104 or firmware processor 304 may load the preserved states in data structures of updated firmware image 118.

Processor 104 or firmware processor 304 may recreate a previously discarded state and may resume firmware services at 410 based further on the recreated state(s).

In an embodiment, at least a portion of firmware image 112 is retained in volatile memory 108, and processor 104 in FIGS. 1 and 2, or firmware processor 384 in FIG. 3 executes the retained portion of firmware image 112 prior to executing updated firmware image 118.

Processor 104 in FIG. 1 or FIG. 2, or firmware processor 304 in FIG. 3 may, for example, load, save, and/or move the portion of firmware image 112 to a location that will not or cannot be overwritten with updated firmware image 118. Processor 104 or boot processor 302 may move the portion of firmware image 112 from a first memory device to a second memory device and may load updated firmware image 118 to the first memory device. This may be useful to allow the entirety of the first memory device to be overwritten with updated firmware image 118.

The retained portion of firmware image 112 may include the firmware update service, or a portion thereof. Updated firmware image 118 may include a firmware update service for use in a subsequent firmware update.

In an embodiment, the retained portion of firmware image 112 includes instructions to permit processor 104 or firmware processor 304 to confirm suitability of updated firmware image 118.

The retained portion of firmware image 112 may further include a mechanism (e.g., within a CDO) to skip a hardware initialization portion of updated firmware image 118. The mechanism may include a pointer or other mechanism.

Alternatively, the entirety of firmware image 112 may be retained in volatile memory 108.

Method 400 may be expanded upon, such as described below with reference to FIG. 5.

Figure 5:
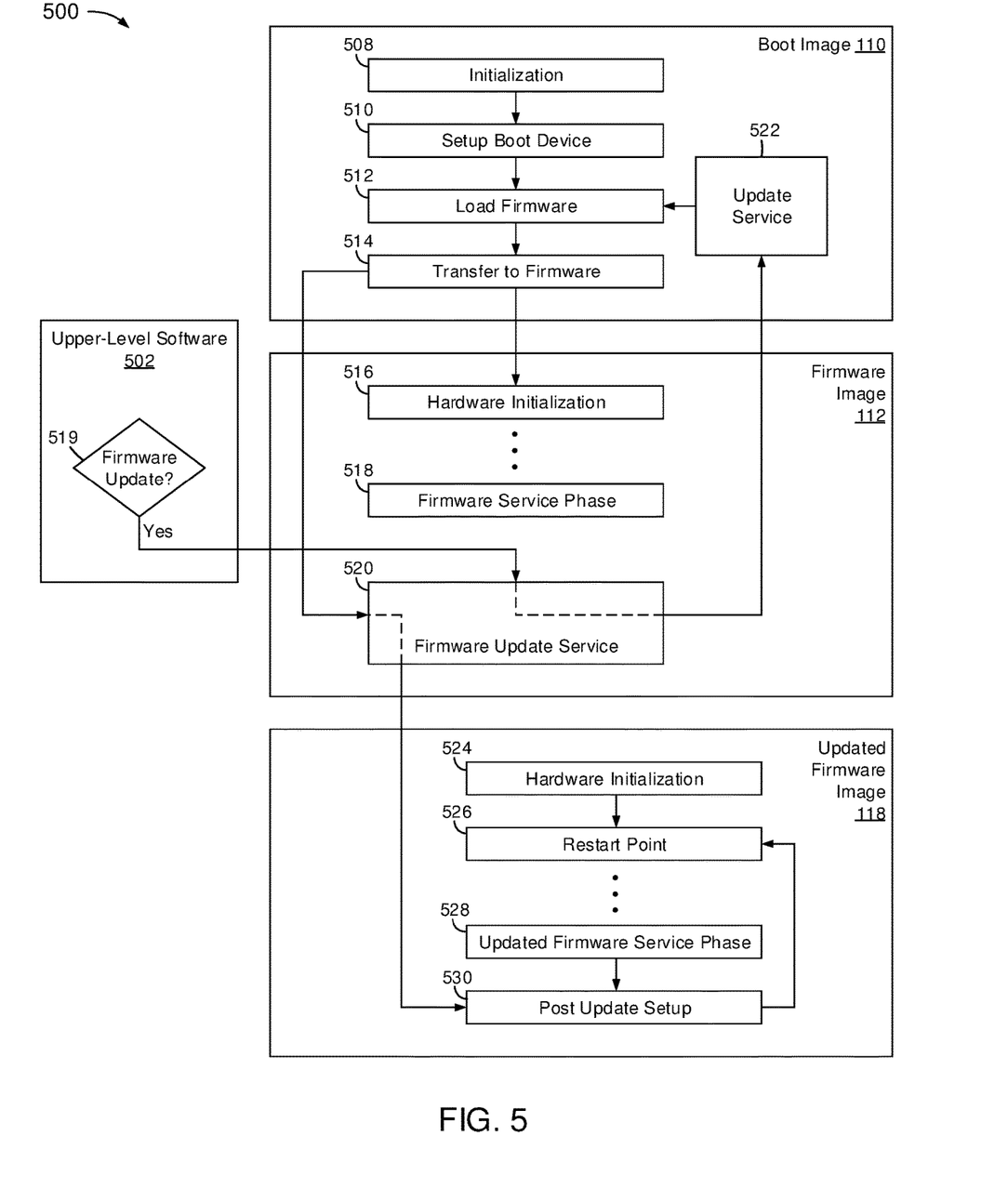
FIG. 5 is a flowchart of another method of performing an impactless firmware update, according to an embodiment.

FIG. 5 is a flowchart of a method 500 of performing an impactless firmware update, according to an embodiment. Method 500 includes features described above with respect to method 400, and additional features.

For illustrative purposes, in FIG. 5, features of method 500 are illustrated within respective boxes labeled boot image 310, firmware image 112, updated firmware image 118, and upper-level software 502. Upper-level software 502 may represent an operating system or application program executing on processor 104 in FIG. 1 or subsystem 204 in FIG. 2 or FIG. 3, such as operating system 210 or application program(s) 212.

At 508, processor 104 in FIG. 1 or FIG. 2, or boot processor 302 in FIG. 3 performs initialization processes based on boot image 110. The initialization processes may include setup of phase locked loops (Pas), zeroization, and voltage and temperature checks.

Processor 104 or boot processor 302 may perform the initialization processes following a system or platform reset.

At 510, processor 104 in FIG. 1 or FIG. 2, or boot processor 302 in FIG. 3 performs a boot device setup based on boot image 110.

At 512, processor 104 in FIG. 1 or FIG. 2, or boot processor 302 in FIG. 3 loads firmware image 112 to volatile memory 108. Processor 104 or firmware processor 304 may also decrypt and authenticate firmware image 112 at 512.

At 514, processor 104 in FIG. 1 or FIG. 2 transfers, or switches from executing boot image 110 to executing firmware image 112. In FIG. 3, boot processor 302 may be idled or placed in a sleep state, and firmware processor 304 may be woken to process firmware image 112. Boot processor 302 may release a reset on firmware processor 304.

At 516, processor 104 in FIG. 1 or FIG. 2, or firmware processor 304 in FIG. 3 initializes hardware of platform 100 based on firmware image 112. In FIG. 2, processor 104 may initialize hardware of subsystem 202. In FIG. 3, firmware processor 304 may initialize hardware of subsystem 202.

At 518, processor 104 in FIG. 1 or FIG. 2, or firmware processor 304 in FIG. 3 enters a firmware service phase, such as described above with respect to 402 in FIG. 4.

At 519, upper-level software (e.g., an operating system executing on processor 104 in FIG. 1 or on subsystem 204 in FIG. 2 or FIG. 3), generates a firmware update service request, such as described above with respect to 404 in FIG. 4.

At 520, processor 104 in FIG. 1 or FIG. 2, or firmware processor 304 in FIG. 3 invokes a firmware update service of firmware image 112 in response to the firmware update service request. Processor 104 or firmware processor 304 may save states of firmware services, disable processing of firmware service requests, and determine compatibility of updated firmware image 118, such as described above with respect to 406 in FIG. 4.

At 522, processor 104 in FIG. 1 or FIG. 2, or firmware processor 304 in FIG. 3 invokes an update service of boot image 110 to load updated firmware image 118.

In FIG. 3, firmware processor 304 may assert a software interrupt dedicated to firmware updates to wake boot processor 302. Firmware processor 304 may then idle (e.g., enter a sleep state) until it receives an indication that updated firmware image 118 is loaded. Boot processor 302 may wait for firmware processor 304 to enter the sleep state before executing the update service at 522. Boot processor 302 may determine the state of firmware processor 304 by checking a global register.

Processor 104 or boot processor 302 may receive a location address of updated firmware image 118 and/or other information, such as through registers. The other information may identify the update service of boot image 110 and related attributes.

Processor 104 or firmware processor 304 may set a firmware update flag. Alternatively, processor 104 or firmware processor 304 may set the flag as part of the firmware update service at 520. The latter approach may simplify the update service at 522.

Processing then returns to 512, where processor 104 in FIG. 1 or FIG. 2, or boot processor 302 in FIG. 3 loads updated firmware image 118 based on the location address, such as described above with respect to 408 in FIG. 4.

At 514, processor 104 in FIG. 1 or FIG. 2 transfers or switches from executing boot image 110 to executing a remaining portion of the firmware update service of firmware image 112 at 520. In FIG. 3, boot processor 302 may be idled or placed in a sleep state, and firmware processor 304 may be woken to process the remaining portion of the firmware update service.

The remaining portion of the firmware update service may be retained in memory, such as described above with respect to 410 in FIG. 4.

Further to the description above with respect to 410 in FIG. 4, the remaining portion of the firmware update service may include instructions to cause processor 104 or firmware processor 304 to confirm suitability of updated firmware image 118.

The remaining portion of the firmware update service may further include a mechanism (e.g., within a CDO) to cause processor 104 or firmware processor 304 to execute updated firmware image 118 beginning with a post update setup service at 530.

In the post update setup service at 530, processor 104 or firmware processor 304 may read the states preserved by the firmware update service of firmware image 112 at 520 from a saved state region of memory and may load or write the preserved states to data structures of updated firmware image 118. Processor 104 or firmware processor 304 may also recreate one or more previously discarded states.

Although compatibility was previously checked, if there is an issue, an uncorrectable error may be logged, and processor 104, boot processor 302, or firmware processor 304 may trigger a reboot or system reset.

At 526, processor 104 in FIG. 1 or FIG. 2, or firmware processor 304 in FIG. 3 branches to a restart point of updated firmware image 118. Branching to the restart point permits bypassing of hardware initialization at 524. Hardware initialization at 524 may be skipped because hardware was not powered down and states were either preserved at 520 or recreated at 530.

At 528, processor 104 in FIG. 1 or FIG. 2, or firmware processor 304 in FIG. 3 enters a firmware service phase of updated firmware image 118 to resume processing firmware service requests based on the states restored and recreated at 530.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet. Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A bootable platform, comprising:
    first and second subsystems, wherein the first subsystem is configured to:
      perform firmware services based on an initial firmware image loaded in memory and firmware service requests from the second subsystem; and
      perform a firmware update while the second subsystem remains operational by:
        preserving state information associated with one or more of the firmware services,
        suspending processing of the firmware service requests from the second subsystem,
        loading an updated firmware image in memory while retaining a first portion of the initial firmware image in the memory, and
        resuming the processing of the firmware service requests from the second subsystem based on the updated firmware image loaded in the memory and the preserved state information.

2. The bootable platform of claim 1, wherein the first subsystem is further configured to:
    discard state information associated with one or more other firmware services prior to loading the updated firmware image;
    recreate the state information associated with the one or more other firmware services after loading the updated firmware image; and
    resume the processing of the firmware service requests from the second subsystem based further on the recreated state information.

3. The bootable platform of claim 1, wherein the first subsystem is further configured to bypass hardware configuration services of the updated firmware image when resuming the processing of the firmware service requests from the second subsystem.

4. The bootable platform of claim 1, wherein the first subsystem is further configured to:
    overwrite a second portion of the initial firmware image in the memory when loading the updated firmware image in the memory; and
    resume the processing of firmware service requests from the second subsystem based further on the retained first portion of the initial firmware image.

5. The bootable platform of claim 1, wherein the first subsystem is further configured to:
    retain an entirety of the initial firmware image in the memory when loading the updated firmware image in the memory.

6. The bootable platform of claim 1, wherein the first subsystem is further configured to authenticate the updated firmware image prior to preserving the state information and prior to suspending the processing of the firmware service requests from the second subsystem.

7. The bootable platform of claim 1, wherein the first subsystem is further configured to:
    confirm suitability of the updated firmware image based on image header information.

8. The bootable platform of claim 1, wherein the first subsystem is further configured to queue firmware service requests received from the second subsystem during the firmware update.

9. The bootable platform of claim 1, wherein the first subsystem is further configured to handle correctable errors, and to queue correctable errors that occur during the firmware update.

10. The bootable platform of claim 1, wherein the first subsystem comprises first and second processors, and wherein the first processor is configured to:
    perform the firmware services based on the initial firmware image and the firmware service requests from the second subsystem;
    preserve the state information associated with one or more of the firmware services;
    suspend the processing of the firmware service requests from the second subsystem;
    invoke the second processor to load the updated firmware image in the memory; and
    resume the processing of the firmware service requests from the second subsystem based on the updated firmware image loaded in the memory and the preserved state information.

11. A method, comprising, on a first subsystem of a bootable platform:
    performing firmware services based on an initial firmware image loaded in memory and firmware service requests from a second subsystem of the bootable platform; and
    performing a firmware update while the second subsystem remains operational by:
      preserving state information associated with one or more of the firmware services,
      suspending processing of the firmware service requests from the second subsystem,
      loading an updated firmware image in the memory while retaining a first portion of the initial firmware image in the memory, and
      resuming the processing of the firmware service requests from the second subsystem based on the updated firmware image loaded in the memory and the preserved state information.

12. The method of claim 11, further comprising, on the first subsystem:
   discarding state information associated with one or more other firmware services prior to loading the updated firmware image;
   recreating the state information associated with the one or more other firmware services after loading the updated firmware image; and
   resuming the processing of the firmware service requests from the second subsystem based further on the recreated state information.

13. The method of claim 11, further comprising, on the first subsystem:
   bypassing hardware configuration services of the updated firmware image when resuming the processing of the firmware service requests from the second subsystem.

14. The method of claim 11, further comprising, on the first subsystem:
   overwriting a second portion of the initial firmware image in the memory when loading the updated firmware image in the memory; and
   resuming the processing of firmware service requests from the second subsystem based further on the retained first portion of the initial firmware image.

15. The method of claim 11, further comprising, on the first subsystem:
   retaining an entirety of the initial firmware image in the memory when loading the updated firmware image in the memory.

16. The method of claim 11, further comprising, on the first subsystem:
   authenticating the updated firmware image prior to preserving the state information and prior to suspending the processing of the firmware service requests from the second subsystem.

17. The method of claim 11, further comprising, on the first subsystem:
   confirming suitability of the updated firmware image based on header information.

18. The method of claim 11, further comprising, on the first subsystem:
   queuing firmware service requests received from the second subsystem during the firmware update.

19. The method of claim 11, further comprising, on the first subsystem:
   handling correctable errors, and queuing correctable errors that occur during the firmware update.

20. An integrated circuit, comprising:
   first and second subsystems, wherein the first subsystem is configured to:
     perform firmware services based on an initial firmware image loaded in memory and firmware service requests from the second subsystem; and
     perform a firmware update while the second subsystem remains operational by:
       preserving state information associated with one or more of the firmware services,
       suspending processing of the firmware service requests from the second subsystem,
       loading an updated firmware image in the memory while retaining a first portion of the initial firmware image in the memory, and
       resuming the processing of the firmware service requests from the second subsystem based on the updated firmware image loaded in the memory and the preserved state information.

\* \* \* \* \*